United States Patent [19]  
Vora

[11] Patent Number: 4,914,180  
[45] Date of Patent: Apr. 3, 1990

[54] POLYAMIDES PREPARED FROM 2-(3-AMINOPHENYL)-2-(4-AMINOPHENYL) HEXAFLUORO PROPANE

[75] Inventor: Rohitkumar H. Vora, West Warwick, R.I.

[73] Assignee: Hoechst Celanese Corporation, Somerville, N.J.

[21] Appl. No.: 252,724

[22] Filed: Sep. 30, 1988

[51] Int. Cl.⁴ .................. C08G 69/26; C08G 69/32
[52] U.S. Cl. .................. 528/348; 524/606; 528/26; 528/38; 528/183; 528/220; 528/337; 528/338; 528/339; 528/340; 528/341; 528/343; 528/344; 528/346; 528/347; 528/349
[58] Field of Search .......... 528/348, 26, 337, 340, 528/344

[56] References Cited

U.S. PATENT DOCUMENTS

| | | | |
|---|---|---|---|
| 3,328,352 | 6/1967 | Kwolek | 260/47 |
| 3,356,648 | 12/1967 | Rogers | 260/47 |
| 3,792,148 | 2/1974 | Reske | 264/331 |
| 4,075,172 | 2/1978 | Ozawa | 260/65 |
| 4,111,906 | 9/1978 | Jones | 528/229 |
| 4,592,925 | 6/1986 | DuPont | 427/74 |

*Primary Examiner*—Harold D. Anderson  
*Attorney, Agent, or Firm*—Perman & Greer

[57] ABSTRACT

Polyamides having improved solubility and processing characteristics are provided having incorporated into the polymeric chain a novel aromatic diamine compound, 2-(3-aminophenyl)-2-(4-aminophenyl) hexafluoropropane (3-4'-6F Diamine). The polyamides are prepared by reacting the 3,4'-6F Diamine with an aliphatic or aromatic di-acid or acid halide. It has been found that the polyamides of this invention have improved solubility characteristics, low dielectric constants and improved thermal flow properties as a consequence of the meta/para positioning of the amino groups on the daimine, which renders these polymers more readily melt spinnable for the production of fibers. The polymers may also be compression molded and fabricated into composites at moderate temperatures and pressures.

11 Claims, No Drawings

POLYAMIDES PREPARED FROM 2-(3-AMINOPHENYL)-2-(4-AMINOPHENYL) HEXAFLUORO PROPANE

BACKGROUND OF THE INVENTION

1. Field of the Invention

This invention relates to new fluorine-containing polyamides which exhibit high temperature properties, improved solubility in common organic solvents, and improved thermal flow properties at relatively low temperatures.

2. Description of Related Art

Polycarbonamides are well known in the art as useful polymers for the preparation of molded articles, films, fibers, protective coatings and numerous other applications. The most well known polycarbonamides of the art are those generically known as nylon such as nylon 6,6, nylon, 6, nylon 6,10 and the like. These polyamides are prepared by the condensation of an aliphatic diamine and aliphatic dicarboxylic acid by a variety of well known polymerization techniques.

Aromatic polycarbonamides, generically known as aramids, are also well known in the art. However, because of their high melting points, they cannot be processed by conventional melt fabrication methods and have limited commercial applications. Exemplary of this class of polycarbonamides are those disclosed in U.S. Pat. No. 3,328,352 to Kwolek. The polyamides of this patent are reported to have a minimum melting point of 350° C. Another illustrative aromatic polycarbonamide of the aramid type is the poly(para-benzamide) sold under trademark designation Kevlar 49. The preparation of this polyamide is described in U.K. Pat. No. 1,198,081 and it is also not processible by conventional melt processing methods. Similarly, mixed aromatic/aliphatic polyamides are known in the art, as disclosed in U.S. Pat. No. 3,287,323 which describes the condensation of m-phenylene diamine with adipic, suberic and sebacic acids.

U.S. Pat. 4,075,172 discloses fiber or film-forming aromatic copolyamides prepared be reacting a 3,4'-diaryl diamine with an aromatic dicarboxylic acid or acid chloride. The 3,4'diamine component is present at a maximum amount of about 30 mole percent to impart relative solubility and good mechanical properties into the polymer.

SUMMARY OF THE INVENTION

The present invention provides polyamides having improved solubility and processing characteristics having incorporated into the polymeric chain the novel aromatic diamine compound 2-(3-aminophenyl)-2-(4-aminophenyl) hexafluoropropane, hereinafter referred to as meta/para-6F Diamine or 3,4'-6F Diamine. The polyamides are prepared by reacting the 3,4'-6F Diamine with one or more difunctional acids or acid halides. It has been found that the polyamides of this invention have improved solubility characteristics, low dielectric constants and improved thermal flow and processing properties as a consequence of the meta/para positioning of the amino groups on the diamine, which renders these polymers more readily melt spinnable for the production of fibers. The polyamides of the invention are useful in preparing molded and extruded articles, films and fibers having excellent mechanical, chemical, radiation, thermal and soil resistant properties. They may also be dry spun into fibers from solution and they may be applied in solution to provide protective coatings. In addition, the polycarbonamides of the invention have a lower glass transition temperature than the comparable polycarbonamides of the prior art which adapts them to melt fabrication at a lower processing temperature.

DETAILED DESCRIPTION OF THE INVENTION

The polyamides of this invention may be characterized as comprised of recurring groups having the structure:

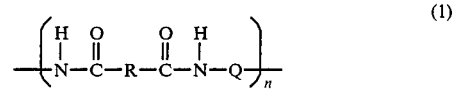

(1)

wherein n is the number of repeating groups, R is a divalent alphatic, aromatic or alicyclic organic radical, and Q in the amidized residuum of 2-(3-aminophenyl)-2-(4-aminophenyl) hexafluoropropane having the formula:

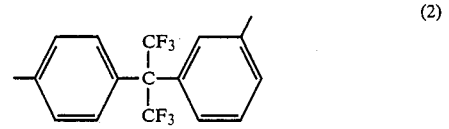

(2)

Preferably R in formula 1 comprises an alkylene, phenylene, naphthalene or a bis-phenylene type compound, or a mixture of such compounds, all of which may be unsubstituted or substituted with halogen, hydroxy, lower $C_1$ to $C_6$ alkyl or lower $C_1$-$C_6$ alkoxy groups, and n is a number sufficient to provide an inherent viscosity of at least about 0.15 dl/g as measured from a solution of the polymer in dimethylacetamide at 25° C. at a polymer concentration of 0.5 weight percent.

The divalent group R is preferably selected from an aromatic moiety having 1 to 4 rings of six carbon atoms characterized by benzenoid unsaturation which may be represented by the formula:

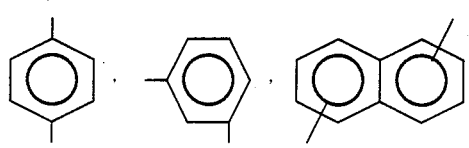

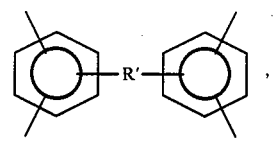

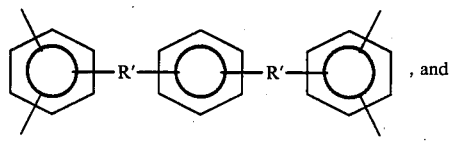

, and

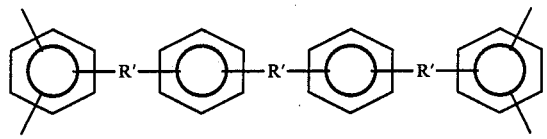

wherein R' is a divalent moiety independently selected from a covalent carbon to carbon bond, methylene, ethylene, propylene, isopropylene, hexafluoroisopropylidene, 1-phenyl-2,2,2-trifluorethylidene, dichloro and difluoroalkylenes up to 3 carbons, oxy, thio, sulfinyl, sulfonyl, sulfonamido, carbonyl, oxydicarbonyl, oxydimethylene, sulfonyldioxy, carbonyldioxy, silanylene, disilanylene, polysilanylene up to 8 Si atoms; siloxanylene, disiloxanylene and a polysiloxanyene up to 8 Si atoms. Preferably, the linking group R' is selected from oxy, hexafluoroisopropylidene, 1-phenyl-2,2,2,-trifluoroethylidene, carbonyl, methylene, a covalent carbon to carbon bond, disiloxanylene and polysiloxanylenes, most preferably, carbon to carbon bond, hexafluoroisopropylidene, 1-phenyl-2,2,2-tri-fluoroethylidene and oxy.

The hydrogen atoms of the groups R and R' may be substituted by non-interferring monovalent substituents such as chloro, fluoro, lower alkyl up to 6 carbons (such as methyl, ethyl, propyl) and phenyl. Also as used herein the term aromatic is meant to include heteroaromatics wherein one or more of the ring atoms is replaced with —O—, —13 — S, or N atoms.

The moiety R may also be selected from an alkylene moiety having one to twenty carbons or an alicyclic aliphatic moiety having from four to eighteen carbons.

Suitable dicarboxylic acids or acid chlorides of which R constitutes the amidization residuum include the diacid chlorides of: isophthalic acid; terephthalic acid; 4,4'-hexafluoroisopropylidene dibenzoic acid; 1,4-phenylenediethanoic acid; 4,4'-biphenyl dicarboxylic acid; 1,1-bis(4-carboxyphenyl)-1-phenyl-2,2,2-trifluoro ethane; 4,4'-dicarboxy diphenyl ether; bis-(4-carboxyphenyl)-methyl phosphane oxide 4,4'-dicarboxyltetraphenylsilane; bis(4-carboxyphenol)-sulfone; 5-tertiary butyl isophtalic acid; 5-bromoisophthalic acid; 5-fluoro-isophathalic acid; 5-chloro-isoophthalic acid; 2,2-bis-(p-carboxyphenyl)propane; 4,4-(p-phenylenedioxy) dibenzoic acid; 2,6-naphthalene dicarboxylic acid; 1,4-cyclohexane dicarboxylic acid; oxalic acid; 1,2-cyclobutadane dicarboxylic acid; 1,4-cyclohexane diacetic acid; malonic acid; 1,10-decane dicarboxylic acid; succinic acid; 1,12-dodecane dicarboxylic acid; 1,18-octadecane dicarboxylic acid; 2,6-cyclohexane dicarboxylic acid; adipic acid; 2,6-cyclohexane dihexanoic acid; bis[2-carboxylphenyl)hexafluoroisopropyl]-diphenyl ether; hexafluoro2,2-bis (4-chlorocarbonylphenyl) propane; bis[2-(4-carboxyphenyl)-hexafluroroisopropyl]diphenyl ether; hexafluoro-2,2-bis(3-chlorocarbonylphenyl) propane; and mixtures thereof.

The preferred diacids or diacid chlorides for the purposes of this invention include those derived from isophthalic acid, terephthalic acid, 4,4'-hexafluoroisopropylidene dibenzoic acid, hexafluoro-2,2-bis (4-chlorocarbonylphenyl) propane, 4,4'-dicarboxy diphenyl ether, and mixtures thereof.

A mixture of two or more of the above diacids or diacid chlorides may also be employed in the production of the polyamides of this invention. Where such mixtures are present; they are preferably present at a molar ratio of from about 3 to 1 to about 1 to 3 based on the total moles of acid present.

Polyamides of the present invention may also be prepared using a mixture of 3,4'-6F Diamine and one or more other dimaines having the formula:

$$NH_2—Y—NH_2 \qquad (3)$$

wherein Y is an aromatic moiety of a phenylene naphthalene or bis-phenylene type compound which may be unsubstituted or ring substituted with halogen, hydroxy, lower $C_1$ to $C_6$ alkyl or lower $C_1$ to $C_6$ alkoxy groups. Where such diamine mixtures are employed, the molar ratio of 3,4'-6F Diamine and said one or more other diamines is preferably within the range of about 2 to 1 to about 1 to 2 based on the total moles of diamine present.

Illustrative of diamines which are suitable for use in mixtures with 3,4'-6F Diamine are: m-phenylene diamine; p-phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl)sulfone; bis(4-aminophenyl) sulfone; 4,4'-diamino-dibenzyl sulfoxide; bis(4-aminophenyl) ether; bis(3-aminophenyl) ether; bis(4-aminophenyl)diethyl silane; bis(4-aminophenyl) diphenyl silane; bis(4-aminophenyl) ethyl phosphine oxide; bis(4-aminophenyl) phenyl phosphine oxide; bis(4-aminophenyl)-N-phenylamine; bis(4-aminophenyl)-N-methylamine; 1,2-diamino-naphthalene; 1,4-diamino-naphthalene; 1,5-diamino-naphthalene; 1,6-diamino-naphthalene; 1,7-diamino-naphthalene; 1,8-diamino-naphthalene; 2,3-diamino-naphthalene; 2,6-diamino-naphthalene; 1,4-diamino-2-methyl-naphthalene; 1,5-diamino-2-methyl-naphthalene; 1,3-diamino-2-phenyl-naphthalene; 4,4'-diamino-biphenyl; 3,3'-diamino-biphenyl; 3,3'-dichloro-4,4'-diamino-biphenyl; 3,3'-dimethyl-4,4'-diamino-biphenyl; 3,4'-dimethyl-4,4'-diamino-biphenyl; 3,3'-dimethoxy-4,4'-diamino-biphenyl; 4,4'-bis(4-aminophenoxy)-biphenyl; 2,4-diamino-toluene; 2,5-diamino-toluene; 2,6-diamino-toluene; 3,5-diamino-toluene; 1,3-diamino-2,5-dichloro-benzene; 1,4-diamino-2,5-dichloro-benzene; 1-methoxy-2,4-diamino-benzene; 1,4-diamino-2-methoxy-5-methyl-benzene; 1,4-diamino-2,3,5,6-tetramethyl-benzene; 1,4-bis(2-methyl-4-amino-pentyl)-benzene; 1,4-bis(1-dimethyl-5-amino-pentyl)-benzene; 1,4-bis(4-aminophenoxy)-benzene; o-xylylene diamine; m-xylylene diamine; p-xylylene diamine; 3,3'-diamino-benzophenone; 4,4'-diamino-benzophenone; 2,6-diamino-pyridine; 3,5-diamino-pyridine; 1,3-diamino-adamantane; 3,3'-diamino-1, 1,1'-diadamantane; N-(3-aminophenyl)-4-aminobenzamide; 4-aminophenyl-3-aminobenzoate; 2,2-bis(4-aminophenyl) hexafluoropropane; 2,2-bis(3-aminophenyl) hexafluoropropane; 2,2-bis[4-(4-aminophenoxy)phenyl]hexafluoropropane; 2,2-bis[4-(2-chloro-4-aminophenoxy)-phenyl hexafluoropropane; 1,1-bis(4-aminophenyl)-1-phenyl-2,2,2-trifluoroethane; 1,1-bis[4-(4-aminophenoxy)phenyl]-1-phenyl-2,2,2-trifluoroethane; 1,4-bis(3-aminophenyl)buta-1-ene-3-yne; 1,3-bis(3-aminophenyl) hexafluoropropane; 1,5-bis(3-aminophenyl) decafluoropentane; and mixtures thereof.

The polyamides of the invention are prepared by standard condensation polymerization techniques well known in the art as, for example, disclosed in U.S. Pat. Nos. 3,287,323 and 3,328,352, the teachings of which are incorporated herein by reference. High molecular weight polymers of the invention may be produced by interfacial or solvent polymerization by reacting at least one aromatic diacid chloride or a substituted derivative thereof with the 3,4'6F-Diamine or mixtures thereof with other diamines.

The following examples are illustrative of the invention.

EXAMPLE 1

Preparation of 3,4,-6F Diamine 2-(3-aminophenyl)-2-(4-aminophenyl)hexafluoropropane monomer was prepared by a six step process employing 2-(4-methylphenyl)hexafluoropropane-2-ol and benzene as starting materials as follows:

(a) Preparation of
2-(4-Methylphenyl)-2-phenylhexafluoropropane.

1290 g of 2-(4-methylphenyl)hexafluoropropan and 780 g of benzene were placed in a 5-liter steel autoclave and 1500 g of anhydrous hydrogen fluoride was pumped into the sealed autoclave. The reaction mixture was heated at 170°–175° C. with stirring for 64 hours. After completion of the reaction, hydrogen fluoride gas was allowed to escape at 80° C., and the liquid product was then washed twice with water, dried over calcium chloride, and fractionally distilled. Boiling point 135°–136° C./1.4 mbar. Yield: 1424 g (89.5%).

(b) Preparation of
2-(4-Carboxyphenol)-2-phenylhexafluoropropane 298 g of 2-(4-methylphenyl)-2-phenylhexafluoropropane prepared in step (a), 2.49 g of cobalt (II) acetate tetrahydrate, 2.45 g of manganese (IV) acetate tetrahydrate, and 0.41 g of hydrogen bromide (corresponding t0 4.1 g of a 10% HBr solution in glacial acetic acid) were placed in a 1-liter glass autoclave. The mixture was heated under an oxygen pressure of 6.5 bar up to approximately 180° C. with an exothermic reaction, and was allowed to stand for 1 hour at 170°–180° C. 200 g of acetic acid was then distilled from the reaction solution cooled to approximately 100° C. 275 g of water was added slowly to the solution remaining in the flask (approximately 600 g) at the boiling point. The carboxylic acid that crystallized out was filtered by suction and washed twice with 75-ml portions of 50% aqueous acetic acid and five times with 85-ml portions of water, and was dried at 60° C./60 mbar. Yield: 311 g (95.5%).

(c) Preparation of
2-(4-carboxyphenol)-2-(3-nitrophenyl)hexafluoropropane 261 g of 2-(4-carboxyphenyl)-2-phenylhexafluoropropane prepared in step (b) was suspended in 500 ml of methylene chloride, and after the addition of 188 ml of concentrated sulfuric acid, 75 ml of concentrated nitric acid was added dropwise at −5 to 0° C. The reaction mixture was stirred for 1 hour longer at this temperature and was then poured onto 2000 g of ice. The solid was filtered off and washed with water until the rinse water had a pH of 3–4. Crud product 208 g, M.p. 180°–185° C. Workup of the filtrate: The organic phase was separated, washed twice with water, dried over magnesium sulfate, and evaporated. The sticky yellow residue was recrystallized twice from toluene, after which an additional 30 g of crude product was obtained with a melting point of 180°–184° C. The combined amount of crude product (238 g) was recrystallized twice from toluene, after which 186 g (63%) of a white solid was obtained that had a purity of 99.2%, determined by gas chromatography.

(d) Preparation of
2-(4-carbamoylphenyl)-2-(nitrophenyl)hexafluoropropane 198 g of 2-(4-carboxyphenyl)-2-(3-nitrophenyl) hexafluoropropane prepared in step (c) was introduced into a mixture of 700 ml of concentrated sulfuric acid and 350 ml of oleum (65%). After the addition of 200 g of sulfamic acid, the reaction mixture was heated for 3 hours at 90°–95° C. The suspension cooled to approximately 20° C. was poured onto approximately 6 kg of ice with constant stirring. The precipitated solid was then filtered off and washed with water until neutral. Yield: 191 g (97%) of white solid. M.p.: 147°–148° C.

(e) Preparation of
4,4'-Bis[2-(3-nitrophenyl)hexafluoroisopropyl]azobenzene 157 g of 2(4-carbamoylphenyl)-2-(3-nitrophenyl) hexafluoropropane prepared in step (d) was introduced at 0 to 5° C. into a mixture of 900 ml of 13% aqueous sodium hypochlorite solution, 150 ml of 50% sodium hydroxide solution, and 5 ml of tricaprylmethylammonium chloride. The suspension was stirred for 24 hours, during which the reaction temperature was not to exceed 50° C. The reaction mixture was neutralized with dilute acetic acid, and the solid was filtered off and washed with water. After recrystallization of the dried crude product (149 g), 61 g of a solid was obtained with a melting point of 185°–187° C. The workup of the mother liquor provided an additional 14 g of the product. Yield: 75 g (52%).

(f) Preparation of
2-(3-aminophenyl)-2-(4-aminophenyl)hexafluoropropane 74.2 of 4,4'-bis[2-(3-nitrophenyl)hexafluoroisopropyl]azobenzene prepared in step (e) was dissolved in 600 ml of ethyl acetate, 1 g of 5% Pd/C was added, and the mixture was reduced with hydrogen (100 bar) in an autoclave, first at 25° C., and when the reaction subsided, at 100° C. After filtering off the catalyst, the solvent was removed. The residue was taken up in dilute hydrochloric acid and treated with activated charcoal. The colorless filtrate obtained from this was neutralized with half-concentrated ammonia solution. The precipitate that separated was filtered off, washed with water, and dried to constant weight. Yield: 48 g (72%) of white solid. M.p.: 142°–143° C.

EXAMPLE 2

Preparation of a polyamide of 3,4'- 6F Diamine and hexafluoro -2. 2-bis (4-chlorocarbonylphenyl) propane (6F-diacid Chloride)

To a four necked 100 ml reaction flask was added 0.9182 grams (0.0027 mole) of 3, 4'- 6F Diamine and 10 grams of dimethyl acetamide under nitrogen atmosphere. The mixture was stirred at −10° C. in an acetone cooling bath. 1.18 grams (0.0027 mole) of 6F-Diacid Chloride was then gradually added over a period of 15 minutes. 0.28 grams of triethylamine was then added dropwise under continued agitation at 0 to 5° C. 14.1 grams of dimethyl acetamide was added and the mixture was allowed to agitate for about 3 hours at 15° C., after which 2.18 grams of pyrridine was added and the mixture allowed to agitate at room temperature for about 20 hours. The resulting reaction product was filtered to remove the pyrridine hydrochloride salt and washed twice with dimethyl acetamide solvent. The filtrate was then washed several times with deionized water and methanol, which caused the polymer to precipitate.

The polymer had an inherent viscosity of 0.3 dl/g. as measured at 0.5g/dl at 25° C. in dimethylacetamide.

EXAMPLE 3

Example 2 was repeated except that the 3, 4'-6F Diamine was replaced entirely by 2,2-bis (3-aminophenyl) hexafluoropropane, which was reacted with an eguimolar quantity of the 6F-Diacidchloride.

EXAMPLE 4

Example 2 was repeated except that the 3, 4'-6F Diamine was replaced entirely by 2,2-bis(4-aminophenyl) hexafluoropropane, which was reacted with an equimolar quantity of the 6F-Diamine.

The inherent viscosity of each of the polyamides produced in Examples 2-4 are reported in Table 1. Also reported are the glass transition temperatures (Tg° C.) as measured by differential scanning calorimetry and the TGA temperature in degrees centigrade at which a 5% weight loss in air is encountered. The weight average (Mw) and number average (Mn) molecular weights of each polyamide are also reported, as well as the dispersity factor (d) which approximates the Mw divided by the Mn. Films of each of the polyamides were also prepared by making draw downs of a 20% solution of the polymer in dimethylacetamide and evaporating off the solvent.

dimethylformamide (DMF), propylene glycol methyl ether (PGME), and the like.

The polyamides also exhibit improved thermal flow properties and may be melt spun to form fibers and filaments. Because of their good solubility in common organic solvents, films may be cast from solvent solutions. Such films may be used as printed circuit backings, insulating dielectric interlayers and other applications where tough, high temperature stable films having good dielectric properties have been used in the past.

The polyamides of the invention either alone or in combination with other materials may be shaped into useful articles; e.g. by molding, extrusion, spinning, solution casting and other known processes. Illustrative applications of the polymers of the invention include molded parts such as high temperature insulators, transparent fuel filter assemblies, seals, gaskets, thrustwashers, pipes of high thermal stability and corrosion resistance, high temperature and inert insulating passivation and protective films, high strength-heat resistant fibers in tire cords, flame resistant clothing, ballistic protection vets, composite articles with other organic and/or inorganic fillers and fibers or in open fiber mats as the impregnating material in laminates and other application obvious to the skilled artisan. Advantageously fillers such as glass fibers, silica, molybdenum, graphite, and PTFE may be compounded or blended with the above specified polyamides to form molding and extrusion composition.

In the preparation of laminates, a laminating varnish may be prepared by dissolving the above specified polyamides in a suitable solvent such as N-methylpyrrolidone, digylme, dimethylformamide, proplene glycol methyl ether, and the like. The polyamide varnish solution is then applied to a suitable reinforcing fabric such as a boron fiber fabric, a quartz fiber fabric, graphite or

TABLE 1

| Ex. | 6F Diacid Chloride | Di-amine | Inherent viscosity dl/q | GPC Mw | Mn | d | DSC Tg °C. | TGA 5% wt. loss at °C. | Polymer and Film Characteristics |
|---|---|---|---|---|---|---|---|---|---|
| Ex. 2 | | 3,4'-6F | 0.3 | 27202 | 16511 | 1.7 | 254 | 480 | White color polymer soluble organic solvent transparent film characteristics |
| Ex. 3 | | 3,3'-6F | 0.19 | 26221 | 14172 | 1.9 | 244 | 490 | White color polymer, soluble in organic solvent, clear transparent film characteristics |
| Ex. 4 | | 4,4'-6F | 0.26 | 32330 | 17134 | 1.9 | 303 | 470 | White color polymer, soluble in organic solvent, clear transparent film characteristics |

As can be seen from the data in Table 1, the polyamides of this invention exhibit excellent heat stability and a significantly lower Tg than the polyamide counterpart prepared from the 4,4'-6F diamine monomer, which means the polymer is much easier to process.

The polyamides exhibit good solubility properties in solvents such as N-methyl pyrrolidone (NMP), dimethyl acetamide (DMAc), diglyme, methylethylketone (MEK), tetrahydrofuran (THF), acetone, chloroform, butyrolactone (BLO), dimethylsulfoxide (DMS), glass fabric and the solvent removed and a fused shaped part is formed using vacuum bag or autoclave laminating procedures. Similarly, these polyamides may be processed into fibers by melt or solution techniques and knitted or braided into a fabric or structural form which is then laminated with a reinforcing fabric of glass, boron, quartz or graphite, optionally with a laminating varnish, under heat and pressure. Similarly, glass, quartz, boron and graphite fibers may be mixed with a solution of these polyamides, the solvent removed by heat and optionally reduced pressure and the mixture fused into a article of the desired shape by the use of heat and pressure.

The invention has been described by way of the above specification and illustrative examples and it is to be understood that this invention is not limited to the specific embodiments thereof except as defined by the following claims:

What is claimed is:

1. A polyamide polymer comprising recurring groups having the structure:

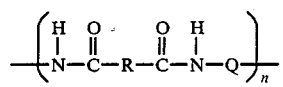

wherein n is the number of repeating groups, R is a divalent alphatic, aromatic or alicyclic organic radical, and Q is the amidized residuum of 2-(3-aminophenyl)-2-(4-aminophenyl) hexafluoropropane having the formula:

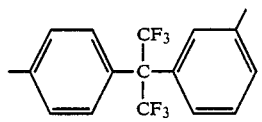

2. The polyamide of claim 1 wherein R is selected from the group consisting of alkylene, phenylene, naphthalene and bis-phenylene radicals which are unsubstituted or substituted with a monovalent radical selected from the groups consisting of halogen, hydroxy; lower $C_1$ to $C_6$ alkyl and lower $C_1$ to $C_6$ alkoxy.

3. The polyamide of claim 1 wherein n is a number sufficient to provide an inherent viscosity of at least about 0.15 dl/g as measured from a solution of the polymer in dimethylacetamide at 25° C. at a polymer concentration of 0.5 weight percent.

4. The polyamide of claim 1 prepared by reacting the amide-acid condensation product of 2-(3-aminophenyl)-2-(4-aminophenyl) hexafluoropropane with a dicarboxylic acid or acid chloride.

5. The polyamide of claim 4 wherein said dicarboxylic acid or acid chloride is selected from the groups consisting of isophthalic acid, terephthalic acid, 4,4'-hexafluoroisopropylidene dibenzoic acid, hexafluoro-2,2-bis (4-chlorocarbonylphenyl) propane, 4,4'-dicarboxy diphenyl ether, and mixtures thereof.

6. The polyamide of claim 4 prepared from a mixture of said 2-(3-aminophenyl)-2-(4-aminophenyl) hexafluoropropane with at least one other diamine having the formula:

$$NH_2-Y-NH_2$$

wherein Y is an aromatic moiety.

7. The polyamide of claim 5 wherein said dicarboxylic acid chloride is hexafluoro-2,2-bis (4-chlorocarbonylphenyl) propane.

8. The polyamide of claim 1 dissolved in organic solvent.

9. A fiber comprising the polyamide of claim 1.

10. A film comprising the polyamide of claim 1.

11. A compression molded, shaped article comprising the polyamide of claim 1.

* * * * *